United States Patent [19]

Ehmke et al.

[11] Patent Number: 5,115,182
[45] Date of Patent: May 19, 1992

[54] BATTERY CHARGING CONTROLLER FOR A BATTERY POWERED DEVICE AND METHOD FOR USING THE SAME

[75] Inventors: Edward L. Ehmke, West Palm Beach; Tuan K. Nguyen; Michael J. DeLuca, both of Boca Raton, all of Fla.

[73] Assignee: Motorola, Inc., Schaumburg, Ill.

[21] Appl. No.: 513,405

[22] Filed: Apr. 23, 1990

[51] Int. Cl.⁵ .............................................. H02J 7/10
[52] U.S. Cl. ..................................... 320/14; 320/22; 320/48; 455/89
[58] Field of Search ................................ 320/22-24, 320/14, 44, 48; 455/89

[56] References Cited

U.S. PATENT DOCUMENTS

| | | | |
|---|---|---|---|
| 4,006,396 | 2/1977 | Bogut | 320/2 |
| 4,435,675 | 3/1984 | Adams | 320/22 |
| 4,468,605 | 8/1984 | Fitzgerald et al. | 320/40 X |
| 4,525,055 | 6/1985 | Yokoo | 320/48 X |
| 4,562,398 | 12/1985 | Kotlarewsky | 320/31 |
| 4,670,703 | 6/1987 | Williams | 320/22 |
| 4,684,870 | 8/1987 | George | 320/23 X |
| 4,709,202 | 11/1987 | Koenck et al. | 320/48 X |
| 4,737,702 | 4/1988 | Koenck | 320/21 X |
| 4,743,831 | 5/1988 | Young | 320/14 X |
| 4,888,544 | 12/1989 | Terry et al. | 320/22 X |
| 4,914,393 | 4/1990 | Yoshido | 320/48 X |
| 4,918,368 | 4/1990 | Baker et al. | 320/22 |

Primary Examiner—R. J. Hickey
Attorney, Agent, or Firm—Philip P. Macnak; Vincent B. Ingrassia; William E. Koch

[57] ABSTRACT

A battery charging controller which can be integrated within a battery powered device having a rechargeable battery includes a circuit for monitoring the energy consumption of the device from the battery, and for accumulating a measure of the energy consumed since the battery was previously charged. Energy consumption is determined based on the number of device functions being active during predetermined sampling time intervals. When the battery powered device is coupled to an external charging source, the charging of the battery, including the charging rate, is controlled by the energy monitoring circuit within the battery powered device. Rapid charging, slow charging, and discharging of the battery before charging are all readily controlled using an external charging source which requires no circuits for monitoring the battery charging process.

40 Claims, 7 Drawing Sheets

BATTERY CHARGING CONTROLLER FOR A BATTERY POWERED DEVICE AND METHOD FOR USING THE SAME

BACKGROUND OF THE INVENTION

1. Field of the Invention

The invention relates generally to the field of battery chargers, and more specifically to a battery powered controller for a battery powered device.

2. Description of the Prior Art

Numerous types of battery chargers are on the market today which provide the capability of recharging secondary rechargeable batteries, such as nickel-cadmium or other rechargeable batteries. Many of these chargers required the removal of the batteries from the battery powered device to enable recharging. Removal of the batteries was generally negatively viewed, as the battery powered device was out of operation while the batteries were being recharged, unless spare batteries were available. Many other chargers had overcome the aforementioned deficiency by providing the capability to recharge the batteries in situ, while the battery remained affixed to, or within the battery powered device. In this manner, the functionality of the device was maintained while the batteries were being recharged. While the functionality of the devices was maintained, the devices were unavailable for operation in the manner intended, that of being transportable. Also, many of the chargers were "trickle" chargers, chargers which recharged the battery at a very low charging rate, consequently the battery powered device was also unusable for normal operation for extended periods of time, such as eight hours and more during which time the battery was being recharged.

Many battery powered devices in use are extremely energy intensive, such as portable communication transceivers which expend considerable amounts of power during the receive function and more particularly during the transmit function. In order to avoid lengthy recharging times, "rapid" chargers were developed to rapidly recharge the batteries at high charging rates for relatively short time periods, such as from one to three hours, as compared to eight hours or overnight for "trickle" charges.

In order to safely "rapid" charge batteries, numerous problems had to be overcome. Overcharging was the most serious problem which resulted in overheating of the battery. Such heating lead to potential damage to the battery case seals, rupturing of the battery case, and in extreme instances explosive rupturing of the battery case. Prior art "rapid" battery chargers overcame most of these problems by monitoring various battery parameters, such as the terminal voltage and internal cell temperatures. Other "rapid" battery chargers utilized timed charging of the battery to avoid overcharging. Such techniques however, did not necessarily insure the rechargeable battery was not being overcharged in all instances. Since many batteries were not fully discharged at the time the batteries were placed into the charger, the use of such charging techniques as timed charging would overcharge the battery unless the battery was first fully discharged. A number of chargers consequently provided automatic discharge of the batteries for a period of time sufficient to insure a fully charged battery was completely discharged. As a result, the time required to "rapid" charge such batteries was increased due to the time added to first discharge the batteries. There is a need for a controller for a charger which can efficiently control the replenishment of only the energy expended.

SUMMARY OF THE INVENTION

It is an object of the present invention to provide a controller capable of monitoring the energy consumed from a battery being operated within a battery powered device.

It is a further object of the present invention to provide a controller for controlling the charging characteristics of an externally coupled battery charger to provide reliable battery charging under a variety of battery conditions.

It is a further object of the present invention to provide a controller for controlling the charging characteristics of an externally coupled battery charger in response to the measure of the energy consumed from the battery.

It is a further object of the present invention to provide a controller for detecting and indicating the presence of defective batteries within the battery powered device.

These and other objects of the invention are achieved by providing a battery charging controller which can be integrated within a battery powered device having a rechargeable battery. The battery charging controller includes a circuit for monitoring the energy consumption of the device from the battery, and for accumulating a measure of the energy consumed since the batter was previously charged. Energy consumption is determined based on the number of device functions being active during predetermined sampling time intervals. The charging of the battery, including the charging rate, is controlled in response to the measure of the energy consumed from the battery. Rapid charging, slow charging, and discharging of the battery before charging are all readily controlled using an external charging source which requires no circuits for monitoring the battery charging process. An indicator can be provided to display the status of the battery.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DESCRIPTION OF THE PREFERRED EMBODIMENTS

Figure 1:
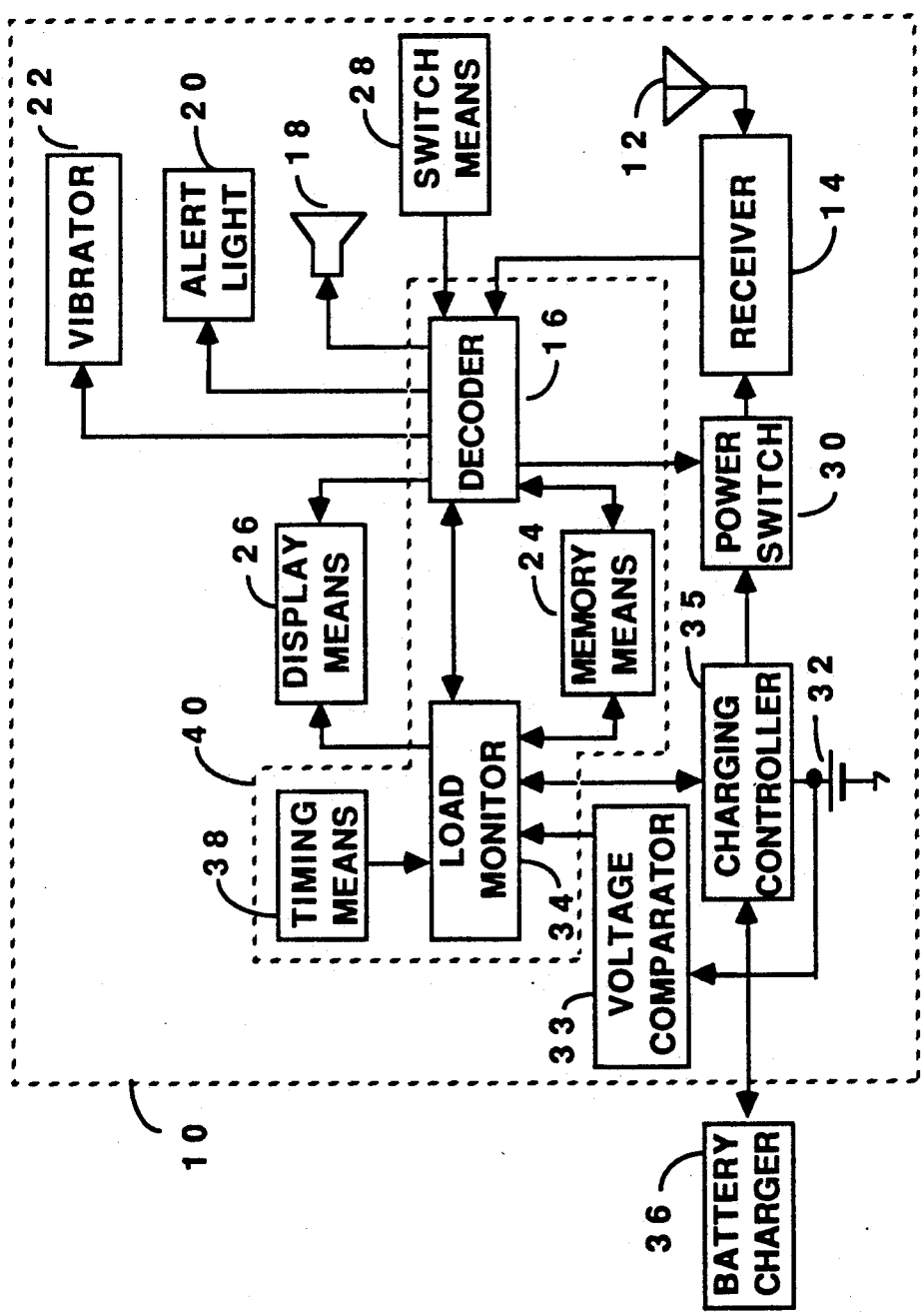
FIG. 1 is an electrical block diagram of a battery powered device including the charging controller of the present invention.

FIGS. 1 through 6 illustrate the implementation and operation of the battery charging controller of the present invention which is suitable for use in a battery powered device. In particular, FIG. 1 is an electrical block diagram of a battery powered device 10, such as a battery powered communication receiver having a display, which includes the charging controller of the present invention. While the description to follow will specifically describe the implementation and operation of the battery charging controller of the present invention in the context of a battery powered communication receiver, such as a paging receiver, it will be appreciated that the battery charging controller of the present invention may be utilized with any type of battery powered device which is configured to recharge the battery in situ within the device as described herein.

The operation of the battery powered communication receiver portion of the battery powered device 10 of FIG. 1 is well known in the art, and only a brief description of the operation of the communication receiver will be provided herein. Information which is intended for the battery powered device 10 is intercepted by antenna 12 which couples to the input of the receiver 14 which receives and detects the transmitted information. When utilized in the context of a paging system, the information transmitted includes address information identifying the receiver for which the message information is intended. The address and message information is suitably encoded into any of a number of well known selective call signaling formats, such as the Golay Sequential Code signaling format or the POCSAG signaling format, for transmission over a communication channel, such as an FM modulated radio frequency (RF) carrier channel. When the GSC or POCSAG signaling formats are utilized, the output of the receiver 14 is a stream of digital information representing the received address and message information. The stream of digital information is coupled to the input of the decoder 16 which decodes the address information. The operation of decoders for decoding the selective call signaling information is well known in the art. When the address information received matches predetermined address information stored within the battery operated device, an alert is generated, alerting the user to the reception of a message. The user may be audibly alerted with the generation of an audible alert tone which is delivered utilizing a speaker or a transducer 18. The user may be visually alerted with the generation of a continuous or flashing visual indication which is delivered utilizing an alert light 20, such as an incandescent lamp or LED. The user may be tactily alerted with the generation of an vibrating alert which is delivered utilizing a vibrator 22. The message information is typically stored in a memory, such as memory means 24 prior to being displayed on a display means 26. Memory means 24 may be a volatile memory, such as random access memory (RAM), or non-volatile memory, such as electrically erasable programmable read only memory (EEPROM). The display means 26 includes a display driver (not shown) which couples to a suitable display, such as a numeric or alphanumeric LCD display. Power to the battery operated device may be switched on and off, the alert signal can be reset, and messages can be recalled from memory for review on the display by a switch means 28, which may include any of a number of well known switches or switching devices. Power is periodically switched on and off to the receiver 14 by power switch 30 under the control of decoder 16 thereby providing the well known battery saving function for selective call receivers.

From the description provided above, it will be appreciated that the energy being consumed from the battery 32 is a function of which receiver functions are active. Table I provides a list of device functions and typical current drains associated with each function of a typical paging receiver when each function is active.

TABLE I

| Device Function | Current |
| --- | --- |
| Alerting current | 60.0 mA |
| Receiver current | 4.0 mA |
| Decoder current | 1.0 mA |
| Display current | 0.4 mA |
| Standby current | 0.1 mA |

As shown in Table I, the energy being consumed from the battery is a minimum when operating in the standby mode, such as when the battery saving function is active. As each additional device function is activated, additional energy is consumed from the battery in a proportion equal to the particular device function activated and the duration of time the particular device function is activated. The battery charger controller of the present invention, which will be described in detail shortly, is capable of monitoring the energy being consumed by each active device function and of accumulating a measure of the energy consumed from the battery since the previous time the battery 32 was recharged. This is accomplished utilizing a load monitor circuit 34, the operation of which is described in detail in FIG. 3. Load monitor circuit 34 provides a monitoring means for monitoring the energy consumed from the battery, and is used to accumulate a measure of the energy consumed by the device since the battery was previously charged. Returning to FIG. 1, a timing means 38 generates periodic timing pulses which couple to the load monitor circuit 34. At the generation of each timing pulse, the load monitor circuit 34 communicates with the decoder 16 to determine which of the device functions as shown in Table I are active. Values corresponding to the energy consumed by each active function during the interval between the generation of timing pulses are stored in memory means 24. Once the load monitor circuit 34 has determined which device functions are active, a value for the energy consumed for each function is recalled from memory means 24 and accumulated with previous energy consumption accumulations to provide a measure of the energy consumed from the battery since the last time the battery was recharged. One input of voltage comparator 33 couples to battery 32, and the second input (not shown) couples to a reference voltage. The voltage comparator 33 provides the capability to monitor the battery voltage to provide an alternate end-of-life battery measurement, as will be described in detail with FIG. 4. The output of voltage comparator 33 couples to load monitor 34 to provide a logic level signal change indicating the end-of-life battery voltage has been reached on the battery. Voltage comparator circuits which provide a logic level signal change at a predetermined voltage threshold are well known in the art.

Returning to FIG. 1, when an external charging source 36, such as a battery charger 36, is coupled to the battery powered device 10, a charge detector circuit 54 which is shown in FIG. 2 senses the presence of the battery operated device 10 being coupled to the external charging source 36. The charging controller 35 selects one of a number of potential charging current rates to recharge the battery, the specific charging current rate being based on energy consumption information obtained from the load monitor circuit 34 at the time the external charging device 36 is connected. Specific details on the selection of the charging current rates will be described in FIGS. 4 and 5.

As the battery is being recharged, the load monitor circuit 34 of FIG. 1 monitors the rate at which the battery is being recharged, and based on the energy capacity of the battery being recharged, and the level of the energy which has been delivered to the battery, the load monitor circuit 34 communicates with the charging controller 32 to either increase the rate of charging with the selection of a larger charging current, or to reduce the rate of charging with the selection of a lower current.

It will be appreciated from the description provided above, the circuits shown within dotted line 40 of FIG. 1 can be implemented using a microprocessor or microcomputer. In particular, memory means 24 may be implemented using the internal random access memory (RAM), or where additional random access memory is required, with off-board RAM. Timing means 38 may be implemented using the microcomputer clock and timing counters to generate the periodic timing pulses to generate interrupts to initiate the sampling of the active device functions. A real time clock may also be provided to provide additional control of the recharging sequence which is based upon the measurement of the time during which recharging is enabled. The microprocessor provides a comparing means to compare the measure of the energy consumed with each predetermined battery energy consumption value with the use of the arithmetic logic unit (ALU). The accumulations required by the load monitor to provide a measure of the energy consumed during normal operation, or energy provided during the charging operation, is readily implemented utilizing the internal microcomputer registers and the arithmetic logic unit (ALU) of the microcomputer. The arithmetic logic unit also functions as a comparing means for comparing the measure of the energy consumed with a number of predetermined energy consumption values for controlling the selection of the charging rates. The microcomputer also readily provides a cycle counting means, such as a register location, for accumulating a cycle count of of the number of times the battery is recharged, and the arithmetic logic unit functions as a cycle count comparing means for comparing the cycle count to a predetermined number of charging cycles to determined when the battery should be deeply discharged. The routines necessary to control the decoder functions using a microcomputer are well known in the art and would be stored within the ROM in the microcomputer. The routines described below in FIGS. 3-6 are readily stored in ROM in the microcomputer. A microcomputer, such as an MC68HC05C4 microcomputer manufactured by Motorola is suitable for such use. Also it will be appreciated, any battery powered device which has a microprocessor or microcomputer could be readily adapted to utilize the battery charging controller of the present invention described herein. The use of a microcomputer to control the functions of a battery powered device, such as a battery powered paging receiver, are described in detail in U.S. Pat. No. 4,518,961 to Davis et al, entitled "Universal Paging Device with Power Conservation" which is assigned to the assignee of the present invention, and which is incorporated by reference herein.

Figure 2A:
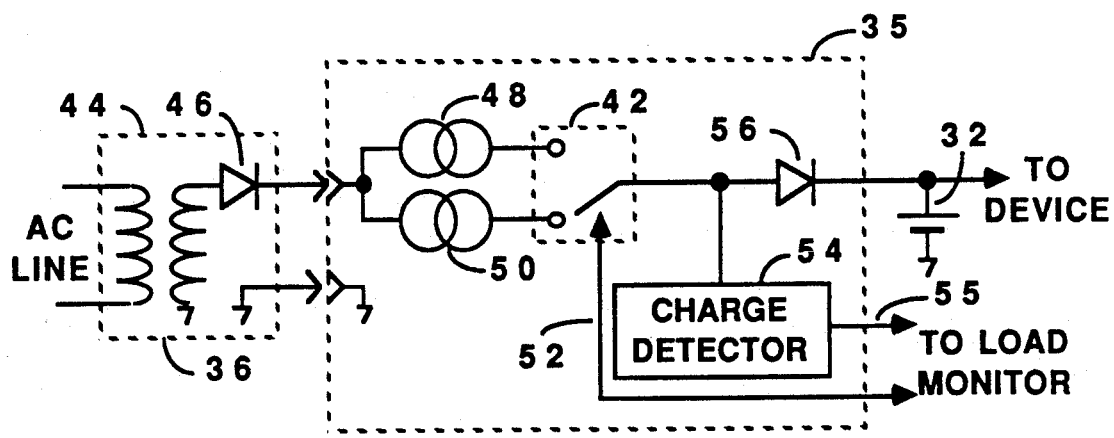
FIGS. 2A–2C are electrical block diagrams of alternate configurations for a portion of the charging controller of the present invention.
Figure 2B:
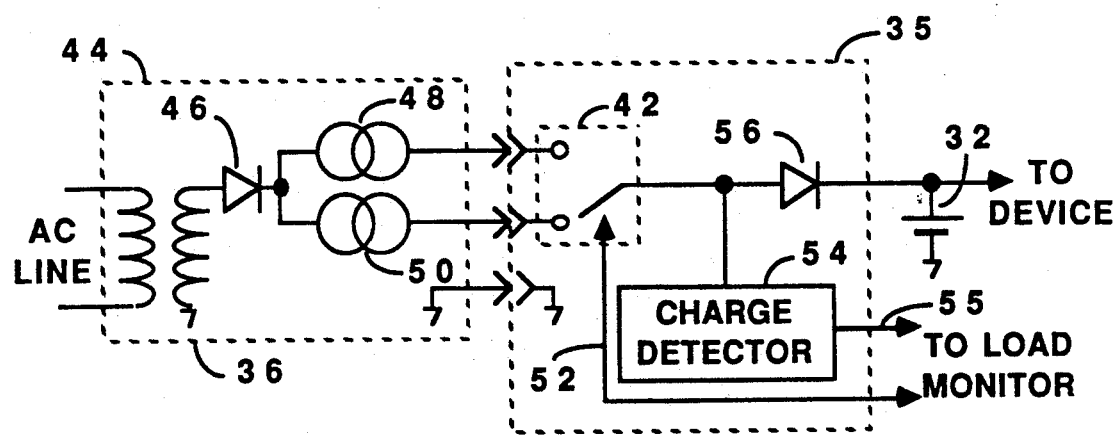
Figure 2C:
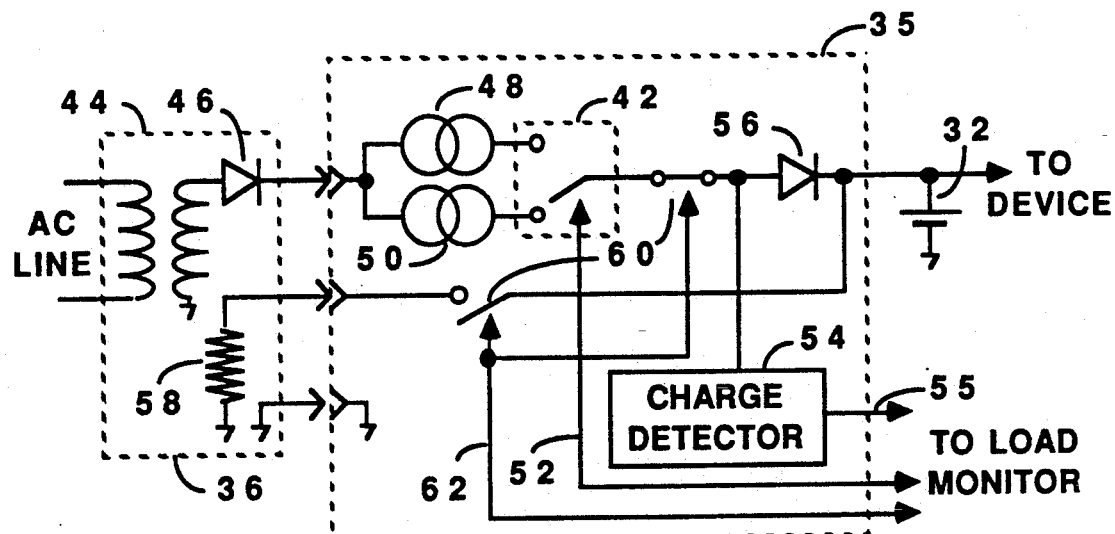

FIGS. 2A-2C are electrical block diagrams of a number of alternate configurations for the charging controller 35 of the present invention. The charging controller 35 provides a controller means for controlling the rate of recharging the battery from the external charging source in response to the measure of the energy consumed by the device, as will be described below. As shown in FIG. 2A, the external charging source 36 is preferably a wall mounted, plug-in style charger which is well known in the art and commonly available for many battery powered devices. It will be appreciated that external charging source 36 may also be provided by a DC (direct current) charging source, such as from a cigarette lighter adapter which plugs into the cigarette lighter outlet in a car.

As shown in FIG. 2A, external charging source 36 includes a step-down transformer 44 which steps down the AC line voltage to an output voltage suitable for charging the battery of the battery powered device. The stepped down AC voltage is rectified by one or more diodes 46 (only one of which is shown as an example for a half-wave rectified output voltage) to provide a rectified output voltage from the external charging source 36. The DC output voltage of external charging source 36 couples to a charging input of charging controller 35 to two charging current control devices 48 and 50. The charging current control devices 48 and 50 may be implemented with any of a number of well known means, such as fixed resistors or transistorized current sources to provide predetermined charging currents. It will be appreciated that there are instances when more than two charging currents are required to recharge the battery, and thereafter maintain the charge to the battery after the battery has been recharged. In these instances additional charging control devices in addition to the two shown in FIG. 2A would be provided.

A selecting means 42 couples to the two charging current control devices 48 and 50 for selecting a first or a second predetermined charging current. The selecting means 42 may be implemented using any of a number of well known means, such as relay operated switch closures and transistor switches. The selection of the first or the second predetermined charging currents is controlled by the load monitor circuit 34 through input 52. A charge detector 54 provides a sensing means for sensing the coupling of the external charging source with the battery powered device 10 and couples to the output of selecting means 42. The charge detector 54 senses the presence of the external charging source 36 by monitoring the presence of a charging voltage. The output 55 from the charging detector 54 also couples to the load monitor 34 to provide an indication of when the external charging source 36 is coupled to the battery powered device 10. In the example shown, a diode 56 is provided to isolate the charge detector 54 from the device battery 32, thereby preventing a false indication of the external charging source 36 being coupled to the device.

The operation of an alternate embodiment of charging controller 35 is shown in FIG. 2B, and is similar to that described in FIG. 2A, except that the two charging current control devices 48 and 50 are included within the external charging source 36. This simplifies the implementation of the charging controller 35, while the battery powered device 10 maintains control of the selection of the predetermined charging currents. All other operations of the charging controller 35 of FIG. 2B correspond to those described for FIG. 2A.

The operation of a further alternate embodiment of the external charging source 36 is shown in FIG. 2C. As shown in FIG. 2C, the external charging source 36 includes a discharging element 58, which is shown for example as a resistor. It will be appreciated that other discharging elements, such as a transistorized current sink or a lamp, such as low voltage incandescent bulb, may be utilized for discharging element 58 as well. The operation of the charging controller 35 is the same as described for FIG. 2A, except that the charging controller 35 of FIG. 2C includes an additional switching means 60. Switching means 60 provides a normally closed contact for the selection of the output from the selecting means 42, and a normally open contact which couples to the output of the charging controller 35 and battery 32, for the selection of the discharging element 58. This embodiment allows the battery to be charged as previously described, and in addition, when the load monitor circuit 24 determines the battery should be discharged before being charged, as will be described in detail below, switching means 60 opens the contact providing charging current to the battery, and closes the contact which couples the battery to discharging element 58. This allows the battery to be first discharged before being charged.

In summary, a charging controller circuit 35 has been described which is incorporated within the battery powered device, and which is used to select from at least two predetermined battery charging currents under the control of the load monitoring circuit 34. In this manner a simple external charging source which does not have any intelligence may be utilized to recharge a rechargeable battery within the battery powered device, and the level of recharging is based upon the value of the measure of the energy consumed from the battery since the battery was previously charged.

The operation of the charging controller of the present invention is best understood providing an example of the energy calculations which are being made to control the battery charging operation. The battery charging operation is controlled by the energy monitoring routine, to be described in FIG. 4. For purposes of description, an N cell Nickel Cadmium (NiCad) battery is assumed as being utilized in the battery powered device. The energy capacity of a battery is measured in milliampere-hours (mAHrs), and is dependant upon a number of operational factors, the most important of which are the rate at which the battery is discharged and the end-of-life battery voltage at which the battery powered device fails to operate correctly. By characterizing each type of battery under typical discharge conditions which are comparable to that experienced in the battery powered device, a value for the usable energy capacity of the battery may be found. In a typical paging receiver application, such as that described by the operating conditions of Table I, a typical N cell Ni-Cad battery has a usable energy capacity of approximately 180 mA-Hrs. The energy monitoring routine individually monitors each device function which is active at predetermined time intervals, such as at intervals of .1 second, to be described in detail below. Table II tabulates the actual energy being consumed by each of the active device functions based on the active operating currents for each function.

TABLE II

| Device Function | Current | Energy Consumed |
|---|---|---|
| Alerting current | 60.0 mA | .001667 mA-Hr |
| Receiver current | 4.0 mA | .000111 mA-Hr |
| Decoder current | 1.0 mA | .000028 mA-Hr |
| Display current | 0.4 mA | .000011 mA-Hr |
| Standby current | 0.1 mA | .000003 mA-Hr | where the energy consumed is calculated by multiplying the active function current, measured in milliamperes (mA), with the time interval between samples, measured in seconds, and with a conversion factor to convert the seconds to hours.

Energy Consumed (mA-Hr) =

$$\text{Current (mA)} \times .1 \text{ Sec} \times \frac{1 \text{ Hr}}{3600 \text{ Sec}}$$

While the current drain values shown in Table II represent typical values which being provided for example only, actual current drain values can be derived from actual measurements of function current drains at the time of manufacture of the device. The measured values can then be programmed into the device code memory, such as memory means 24, which would then provide energy consumption calculations having a very close correlation to the actual energy being consumed by the device.

In order to simplify the calculations within the load monitor circuit 34, the energy consumption values for the active device functions and the battery capacity value are arbitrarily normalized by multiplying each value by 100. The values subsequently utilized to monitor battery energy consumption are shown in Table III, the values of which are stored in the device code memory.

TABLE III

| Device Function | Energy Consumed |
|---|---|
| Alerting current | .167 units |
| Receiver current | .011 units |
| Decoder current | .003 units |
| Display current | .001 units |
| Standby current | .0003 units |
| Battery Capacity | 18,000 units |

The utilization of the information tabulated in Table III will be described in conjunction with the description of FIG. 4. It will be appreciated that the information provided in Tables I, II and III are for example only, and that for other battery operated devices and battery types, similar tables can be established defining the active function currents, the sampling time interval, the energy consumed during the sampling time interval, and the initial battery capacity (XMAX). The battery capacity value is adjusted as described above when the values for the energy consumed by each active function is normalized to a factor other than true mA-Hrs.

Figure 3:
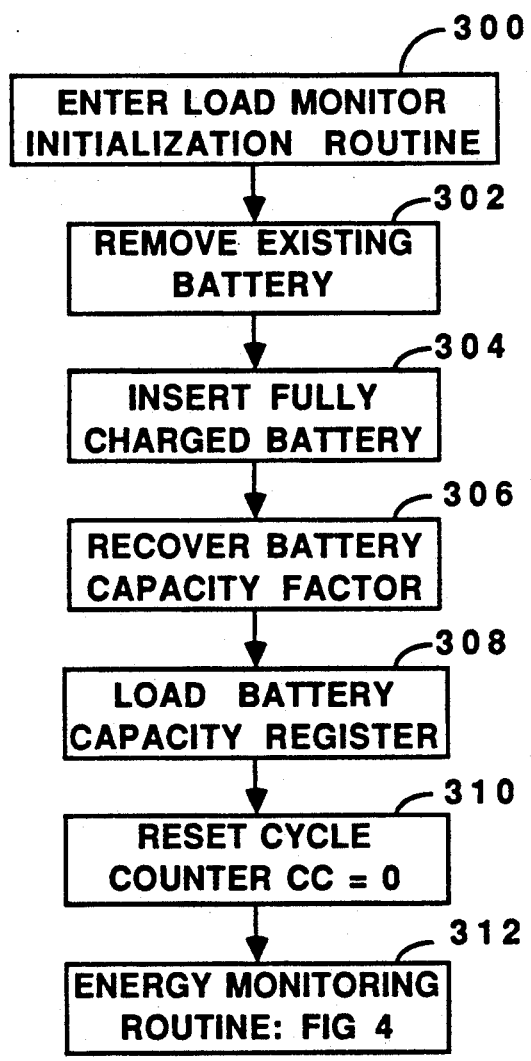
FIG. 3 is a flow diagram of the load monitor initialization routine utilized by the charging controller of the present invention.

FIG. 3 is a flow chart of the routine for the initialization of the load monitor 34. The load monitor initialization routine is entered at step 300, when the battery is removed from the device, at step 302. When a fully charged battery is inserted into the device, at step 304, power is restored to the device. Initialization of the load monitor begins by recovering the battery capacity factor (X MAX) from memory, at step 306, and loading this value into the battery capacity register, at step 308. The cycle counter is next reset at step 310, to provide a count of the number of times the battery is recharged such that a determination can be made when to deeply discharge the battery to minimize "memory effect". The load monitor initialization routine returns to the energy monitoring routine 520 described in FIG. 4 at step 312.

Figure 4:
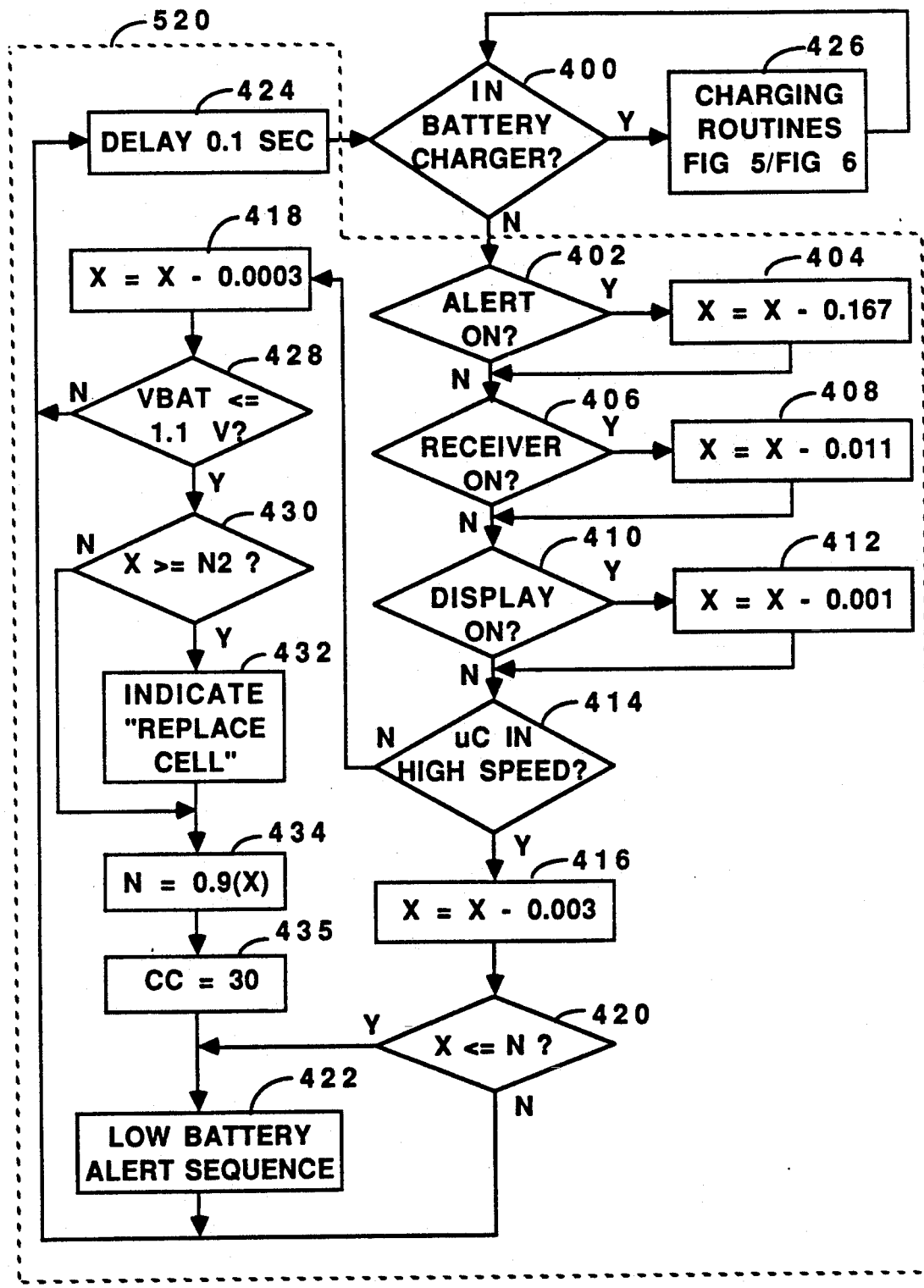
FIG. 4 is a flow diagram of the energy monitoring routine utilized by the charging controller of the present invention.

FIG. 4 is a flow chart of the energy monitoring routine utilized within the load monitor of the present invention. The load monitor periodically monitors the charge detector sense output 55 to determine when the battery powered device is coupled to the external charging source, at step 400. When the battery powered device is not coupled to the external charging source, the load monitor requests an input from the decoder on the status of the alerting circuit, at step 402. If the alerting circuit is active, the value of the energy consumed by the alerting circuit is recovered from memory at step 404 and subtracted from the current battery capacity value (X) being stored in the battery capacity register to determine the battery capacity remaining after this operation.

When the alerting circuit was not active, at step 402, or the current battery capacity value has been calculated at step 404, the load monitor requests an input from the decoder on the status of the receiver, at step 406. If the receiver is active, the value of the energy consumed by the receiver is recovered from memory at step 408 and subtracted from the current battery capacity value (X) being stored in the battery capacity register to determine the battery capacity remaining after this operation.

When the receiver was not active, at step 406, or the current battery capacity value has been calculated at step 408, the load monitor requests an input from the decoder on the status of the display, at step 410. If the display is active, the value of the energy consumed by the display is recovered from memory at step 412 and subtracted from the current battery capacity value (X) being stored in the battery capacity register to determine the battery capacity remaining after this operation.

When the display was not active, at step 410, or the current battery capacity value has been calculated at step 412, the load monitor requests an input from the decoder on the status of the microcomputer decoder, at step 414. If the microcomputer decoder is active, that is operating in a high speed mode for decoding purposes, the value of the energy consumed by the microcomputer decoder is recovered from memory at step 416 and subtracted from the current battery capacity value (X) currently being stored in the battery capacity register to determine the battery capacity remaining after this operation.

When the current battery capacity value (X) has been calculated at step 416, the current battery capacity value (X) is compared with minimum battery capacity factor (N), at step 420. When the current battery capacity value (X) is less than the minimum battery capacity factor (N), at step 420, a low battery alert sequence is generated, at step 422, alerting the user of an impending low battery condition. When the current battery consumption value (X) is greater than the minimum battery capacity factor (N), at step 420, the load monitor begins repeating the sampling process, at step 400, after a predetermined delay has occurred, at step 424, which in the preferred embodiment of the present invention is 0.1 second. It will be appreciated that where the level of the energy consumed is very small, or where the overall usable battery life is very long, a longer delay interval may be provided without significantly detracting from the accuracy of the calculations. Likewise, where the level of the energy consumed is very large, or where the overall usable battery life is very short, a shorter delay interval may be provided without significantly detracting from the accuracy of the calculations. It will also be appreciated, depending upon the type of battery powered device in use, the number of active functions which are monitored is a function of the number of functions which can be operated independently, and these functions can be monitored in any desired order.

In the preferred embodiment of the present invention, the minimum battery capacity factor (N) is selected to provide approximately twenty-four device operating hours in the low battery condition, thereby providing the user the opportunity to complete operation during the day before recharging is necessary. Where the energy usage of the battery powered device is extremely intensive, the criteria for the selection of the minimum battery capacity factor may be different, such as ten percent of the fully charged battery capacity, thereby providing the user the opportunity to continue operation for a period of time before recharging is necessary.

When the microcomputer decoder is not active, at step 414, the value of the energy consumed during standby operation is recovered from memory at step 418 and subtracted from the current battery capacity value (X) being stored in the battery capacity register to determine the battery capacity remaining after this operation.

When the current battery capacity value (X) has been calculated, at step 418, a secondary check of the battery condition is performed to provide for the detection of a battery having reduced capacity which may be due to irreversible "memory effect" or other possible cell or other manufacturing defects. A voltage comparison means, such as the voltage comparator 33 of FIG. 1, compares the current battery voltage to a predetermined end-of-life battery voltage, at step 428, which in the case of a nickel-cadmium battery is typically 1.1V. It will be appreciated that the end-of-life battery voltage for other types of rechargeable batteries will be different, and that the value of the end-of-life battery voltage shown at step 428 is for example only. Preferably, the measurement of the battery voltage performed at step 428 is performed when no device functions are active which would unduly reduce or distort the battery voltage.

When the battery voltage is less than the end-of-life battery voltage at step 428, the current battery capacity value (X) is compared to a second predetermined minimum battery capacity factor (N2) at step 430; otherwise, the load monitor repeats the sampling process, at step 400, after a predetermined delay has occurred, at step 424. The value of the second minimum battery capacity factor (N2) is selected to provide an indication of when the battery should be replaced. In the preferred embodiment of the present invention, the second predetermined minimum battery capacity factor is set to a value of sixty percent of the maximum battery capacity. When the current battery capacity value (X) is greater than the second predetermined minimum battery capacity factor (N2), an indication is generated for the user, at step 432, that the battery should be replaced. When the current battery capacity value (X) exceeds the second predetermined minimum battery capacity factor (N2), this signifies very little energy was drawn from the battery, as measured by the energy monitoring routine before the voltage indicator is tripped, indicating the end-of-life of the battery is reached. This indication is typical of rechargeable batteries with internal defects. The indication provided can include an annunciator which is turned on, such as an icon on an LCD display, displaying the word "replace cell" on the LCD display, or illuminating a visual indication such as an LED. When the current battery capacity (X) is less than the second predetermined battery capacity factor (N2), at step 430, or after the user is alerted of the requirement to replace the battery at step 432, the first predetermined minimum battery capacity factor (N) is adjusted, at step 434, by a predetermined factor, which in the preferred embodiment of the present invention is ninety percent of the current energy capacity value. The cycle counter is set to thirty, at step 435, to provide an indication the battery should be deeply discharged the next time the battery powered device is coupled to the external charging source. The low battery alert sequence is generated at step 422, audibly alerting the user of a low battery indication. By using the voltage comparator with the energy monitoring routine of the present invention, as described above, the preferred embodiment shows that any battery powered device which utilizes a rechargeable battery, may be provided with a simple indicator to provide an indication to the user of when the rechargeable battery requires replacement, well in advance of the time when the battery can no longer be recharged.

While the description provided in FIG. 4 for steps 402 through 418 describe the operation as one of subtracting the value of the energy consumed for each active function from the current battery capacity value, it will be appreciated this operation results in an accumulation of a value for the energy consumed for each active device function during the predetermined time interval, as shown below.

energy consumed = maximum battery capacity − current battery capacity

The measure of the energy consumed (which is defined as the total energy consumed since the battery was previously charged) can directly be obtained y adding the values of the energy consumed during the initial sampling time interval and each subsequent sampling time interval. In this case the current battery capacity would then be calculated as follows.

current battery capacity = maximum battery capacity − energy consumed

Table IV below is provided to visually describe the relationship between energy consumption, or energy being consumed, and the battery capacity, or battery capacity value.

TABLE IV

| Energy Consumed | Current Battery Capacity |
|---|---|
| 10% | 90% |
| 20% | 80% |
| 20% | 80% |
| 80% | 20% |
| 90% | 10% |

When the charging detector senses the battery powered device is coupled to the external charging source, at step 400, the charging routine is entered, at step 426, which is described in detail below. The charging routines then return to step 420 upon completion.

A brief summary of the various charging modes which are utilized in the preferred embodiment of the present invention are shown in Table V, below.

TABLE V

| Case # | Battery Condition | Charging Mode |
|---|---|---|
| Case 1 | fully charged | trickle charge |
| Case 2 | >= 80% charged | trickle charge |
| Case 3 | 25% <= charge <= 80% | rapid charge |
| Case 4 | <25% charged (CC < 30) | trickle charge |
| Case 5 | <25% charged (CC >= 30) | discharge/trickle charge |
| Case 6 | device switch on | do not discharge/rapid charge |

As shown in Table V above, the rate at which a battery is charged is determined by the value of the energy remaining within the battery at the time the battery is to be charged or by unusual circumstance described in steps 428 and 430 of FIG. 4. The decision to discharge the battery (case 5) is determined by the number of times the battery has been previously charged. In the preferred embodiment of the present invention, the battery is discharged only once within thirty recharging sessions, although it will be appreciated that other recharging intervals may be utilized as well. Deep discharging of the battery is provided to prevent the formation of the well known "memory effect" common to some rechargeable batteries. When the battery powered device is switched on while coupled to the external charging device (case 6), the discharging of the battery is suspended until the next charging session during which power to the battery powered device is switched off. As can be seen from Table V, each charging session may utilize one or more predetermined charging rates. It will be appreciated that the actual number of predetermined cases utilized can be greater or less depending upon the charging requirements of the battery being recharged. A battery being recharged as in case 2 would be recharged at only a first predetermined charging rate, trickle charge (battery capacity>80%). A battery being recharged as in case 3 should be recharged with at least two predetermined charging rates, a first predetermined rate for rapid charging (25% <battery capacity<80%), followed by a second predetermined charging rate for trickle charging (battery capacity >80%). A battery being recharged as in case 5 would be discharged, and then recharged using at least three predetermined charging rates, a first predetermined rate for trickle charging (battery capacity <25%), a second predetermined rate for rapid charging (25% <battery capacity <80%), and a third predetermined rate for trickle charging (battery capacity >80%). A fourth predetermined charging rate may be utilized for maintaining the charge on the battery, after the battery has been completely charged. This fourth charging rate is preferably less than or equal to the trickle charging rate. From the description provided above, it will be appreciated that the term first predetermined charging rate means the first charging rate applied to the battery. The term second predetermined charging rate means the second charging rate applied to the battery, and so on. The charging rates are controlled to replenish that portion of the battery energy capacity for each of the cases described above.

The operation of the charging controller of the present invention during the charging operation is best understood through an example of the energy calculations which are being made during the battery charging operation.

TABLE VI

| Function | Rate | Relative Rate |
| --- | --- | --- |
| slow charge | 0.1 C | 0.05 units |
| fast charge | 2.0 C | 1.00 units |
| discharge | 1.5 C | 0.75 units |

Table VI summarizes the charging and discharging rates utilized in the preferred embodiment of the present invention, as well as the relative rate used for computational purposes by the load monitor circuit Computation of the relative rates is the same as described for Table III and is based upon the use of a 180 mA-Hr capacity battery and a 0.1 second charging time interval The equation for computation of the relative charging rate is repeated below as follows. An example is provided for the computation at a 2C charging rate.

$$\text{Relative Rate} = \text{Rate} \times \text{Capacity} \times \text{Time} \times \text{Normalizing Factor} \times \text{Conversion Factor}$$

$$= 2 \times (180 \text{ mA}) \times .1 \text{ Sec.} \times 100 \times 1 \text{ Hr}/3600 \text{ Sec}$$

$$= 1.00 \text{ units}$$

Figure 5:
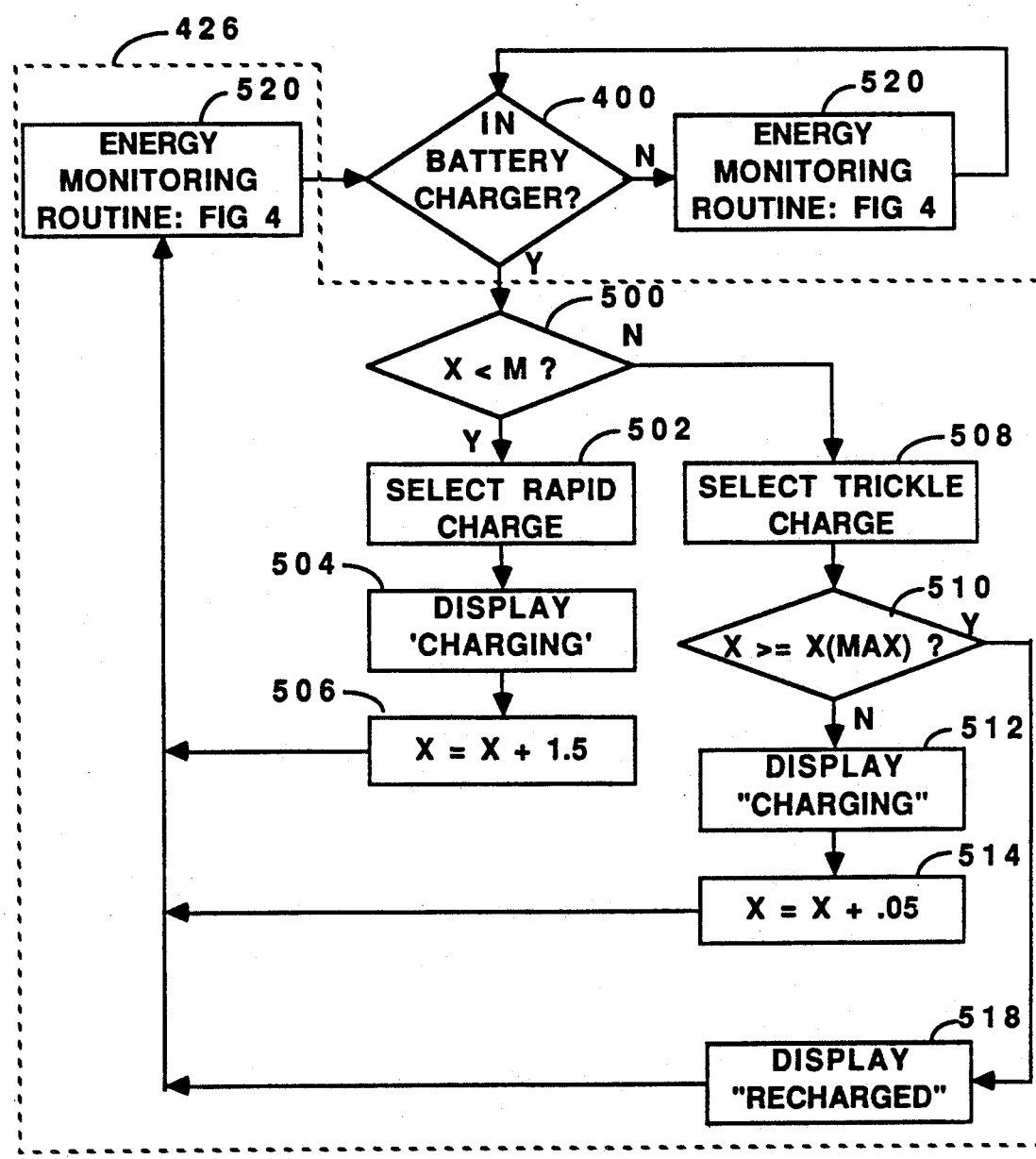
FIG. 5 is a flow diagram showing one embodiment of the operation of the charging controller of the present invention.

It will be appreciated that the actual charging and discharging rates utilized will vary with the size of battery and the battery manufacturers specifications FIG. 5 is a flow chart showing one embodiment of the operation of the charging controller of the present invention. When the battery powered device is sensed as being coupled to the external charging source, at step 400 of FIG. 5, the current value of the battery capacity is compared to a first predetermined energy capacity value (M), at step 500. In the preferred embodiment of the present invention, the first predetermined energy capacity value (M) corresponds to a battery energy capacity factor of eighty percent, i.e. eighty percent of the maximum energy capacity remains in the battery, or the measure of the energy consumed being twenty percent. When the value of the current energy capacity (X) is less than the predetermined energy capacity value (M), at step 500, the load monitor generates a signal to the charging controller to select a first predetermined charging rate, which in the preferred embodiment of the present invention selects a rapid charging rate, at step 502. When a display is provided on the battery powered device, an indication of the battery being recharged is provided, at step 504. The value of the current battery capacity is updated, at step 506, by adding a value of 1.5 to the current value of the battery capacity register. The energy monitoring routine is entered at step 520, to determine if any battery powered device circuits were activated during the charging period. After a predetermined delay, in this instance 0.1 second, at step 424 of the energy monitoring routine, the load monitor again samples to determine if the battery powered device is coupled to the external charging source, at step 400. Steps 500, 502, 504, 506, 520 and 400 are periodically repeated while the battery is being recharged at the rapid charging rate until the value of the current battery capacity is greater than the predetermined energy capacity value (M), at step 500, or in terms of energy consumed is less than a predetermined energy consumption value.

When the value of the current battery capacity is greater than the predetermined energy capacity value (M), at step 500, the load monitor selects a second predetermined charging rate, which in the preferred embodiment is a trickle charging rate, at step 508. When the value of the current energy capacity is less than the maximum battery energy capacity, at step 510, the indication of charging is continued to be displayed on the display, at step 512. The value of the current battery capacity is updated, at step 514, by adding a value of 0.05 to the current value of the battery capacity register The energy monitoring routine is entered at step 520, to determine if any battery powered device circuits were activated during the charging period. After the predetermined delay, in this instance, 0.1 second at step 424 of the energy monitoring routine, the load monitor again checks to determine if the battery powered device is coupled to the external charging source, at step 400. Steps 500, 508 through 520, and 400 are repeated while the battery is being recharged at the trickle charging rate until the value of the current battery capacity rate equals or exceeds the maximum energy capacity value, at step 510. At this time regular charging is completed and an indication that the battery is "recharged" is displayed on the display at step 518. Steps 520, 400, 500, 508, 510 and 518 are repeated until the battery powered device is removed from the external charging source at step 400, at which time the load monitor returns to the energy monitoring routine, at step 520.

Figure 6:
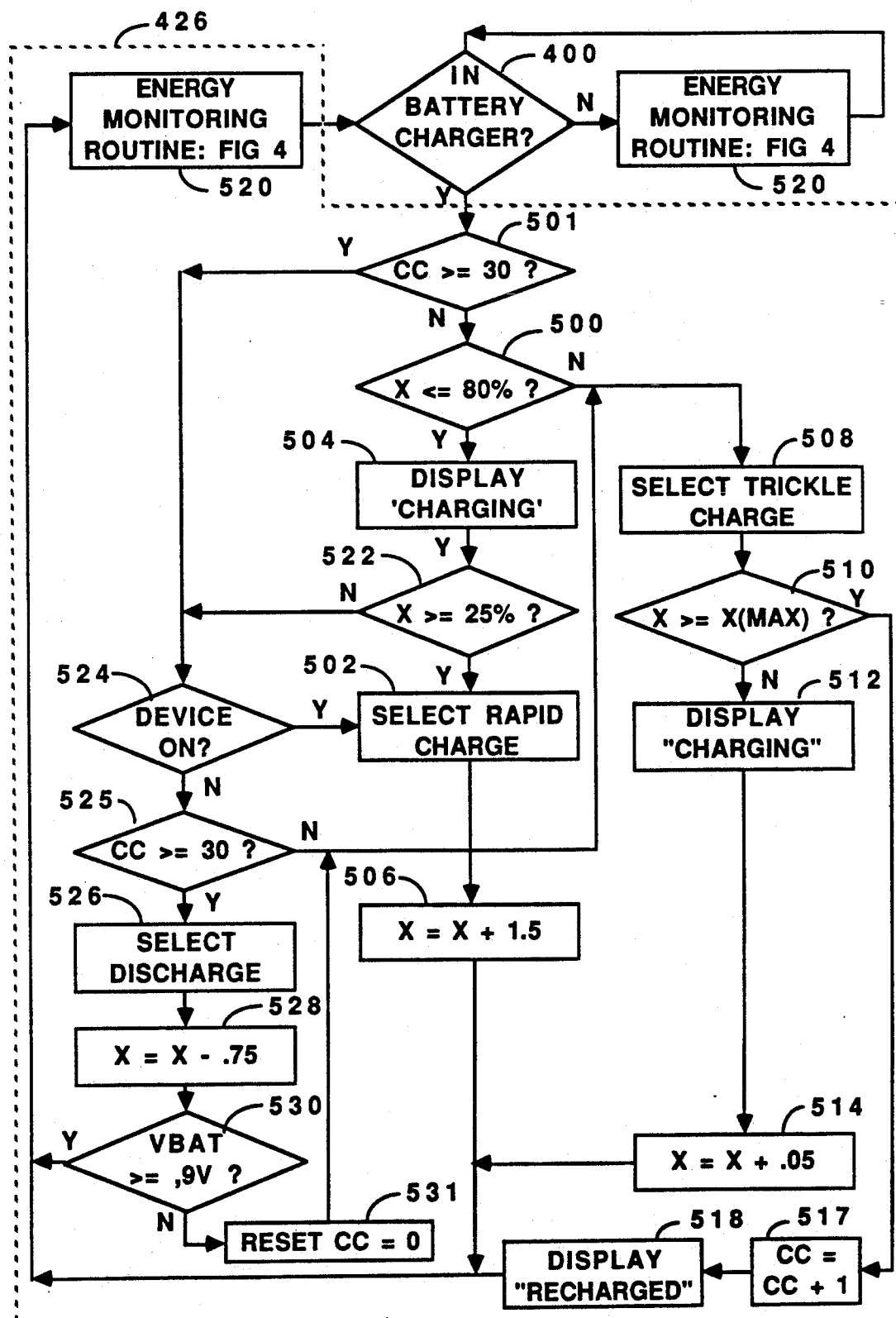
FIG. 6 is a flow diagram showing a second embodiment of the operation of the charging controller of the present invention.

FIG. 6 is a flow chart showing a second embodiment of the operation of the charging controller of the present invention. When the battery powered device is sensed as being coupled to the external charging source, at step 400 of FIG. 6, the current value of the cycle counter is checked to determine if the number of charging sessions is greater than or equal to thirty (CC≧=30), at step 501. If the current value of the cycle counter is less than thirty, the current value of the battery capacity is compared to a first predetermined energy capacity value, at step 500. In the alternate embodiment of the present invention, the first predetermined energy capacity value again corresponds to a battery energy capacity factor of eighty percent, i.e. eighty percent of the maximum energy capacity remains in the battery, or the measure of the energy consumed being twenty percent. When the value of the current energy capacity (X) is less than the first predetermined energy capacity value, at step 500, an indication of the battery being recharged is provided, at step 504. The current value of the battery capacity is compared to a second predetermined energy capacity value, at step 522, which in the alternate embodiment of the present invention, the second predetermined energy capacity value corresponds to a battery energy capacity factor of twenty-five percent, i.e. twenty-five percent of the maximum energy capacity remains in the battery, or the measure of the energy consumed being seventy-five percent. When the value of the current energy capacity (X) is less than or equal to the second predetermined energy capacity value, at step 522, or the current value of the cycle counter was greater than or equal to thirty (CC≧=30), at step 501, the load monitor checks to determine if the device switch is on, at step 524. When the device switch is on, indicating the battery powered device is operating, the load monitor proceeds to the rapid charging sequence beginning at step 502, which will be described below. When the device switch is off, indicating the battery powered device is not operating, the current value of the cycle counter is again rechecked, at step 525, and if the current value of the cycle counter is greater than or equal to thirty, at step 525, the load monitor selects discharging of the battery, at step 526. If the current value of the cycle counter was less than 30, at step 525, the discharging cycle is bypassed, and the battery is trickle charged, as will be described below, beginning at step 508. The value of the current battery capacity is updated, at step 528, by subtracting a predetermined value representative of the rate of charging from the current value of the battery capacity register, which as shown in this example is 0.75. The current battery voltage is then compared to a minimum predetermined discharge voltage, at step 530, which in the preferred embodiment of the present invention is 0.9 volts. When the current battery voltage is greater than or equal to the minimum predetermined discharge voltage, at step 530, the energy monitoring routine is entered at step 520, to determine if any battery powered device circuits were activated during the charging period, after which the load monitor again samples to determine if the battery powered device is coupled to the external charging source, at step 400. Steps 501, 500, 504, 522, 524, 525, 526, 528, 530 520 and 400 are periodically repeated while the battery is being discharged until the current battery voltage is less than the predetermined minimum discharge voltage at step 530, at which point, discharging of the battery is terminated.

In summary, any battery which falls between the twenty-five percent and eighty percent current energy capacity values, and which have been charged at least thirty times previously, are first discharged before the rapid charging cycle is initiated. Such deep discharging of the battery aids in preventing the memory effect, which in time reduces the energy capacity of the battery being recharged. While not specifically shown in the flow chart of FIG. 6, an indication that the battery is being discharged can be displayed during the discharge routine, as a warning to the user that the battery is being discharged, and that the device should not be decoupled from the external charging source until recharging is complete.

When the device is on at step 524, or the battery energy capacity is greater than the second predetermined energy capacity, at step 522, the rapid charge rate is selected at step 502. The value of the current battery capacity is updated, at step 506, by adding a value of 1.5 to the current value of the battery capacity register. The energy monitoring routine is entered at step 520, to determine if any battery powered device circuits were activated during the charging period. After a predetermined delay, in this instance 0.1 second, at step 424 of energy monitoring routine 520, the load monitor again samples to determine if the battery powered device is coupled to the external charging source, at step 400. Steps 500, 504, 502, 506, 520 and 400 are periodically repeated while the battery is being recharged at the rapid charging rate until the value of the current battery capacity exceeds the predetermined energy capacity value, at step 500.

When the current battery voltage is less than the minimum predetermined discharge voltage, at step 530, the cycle counter is reset (CC=0) at step 531, and the load monitor generates a signal to the charging controller to select one of the predetermined charging rates, which in the preferred embodiment of the present invention is the trickle charging rate, at step 508. The trickle charging rate is also selected when the value of the current battery capacity is greater than the predetermined energy capacity value, at step 500, or the number of charge sessions is less than thirty (CC<30), at step 525. When the value of the current energy capacity is less than the maximum battery energy capacity, at step 510, the indication of charging is continued to be displayed on the display, at step 512. The value of the current battery capacity is updated, at step 514, by adding a value of 0.05 to the current value of the battery capacity register. The energy monitoring routine is entered at step 520, to determine if any battery powered device circuits were activated during the charging period. The load monitor again checks to determine if the battery powered device is coupled to the external charging source, at step 400. Steps 501, 500, 508 through 520, and 400 are repeated while the battery is being recharged at the trickle charging rate until the value of the current battery capacity equals or exceeds the maximum battery energy capacity value, at step 510. At this time regular charging is completed and the value of the cycle counter is incremented by one at step 517, and an indication that the battery is "recharged" is displayed on the display at step 518. Steps 520, 400, 501, 500, 508, 510 and 518 are repeated until the battery powered device is removed from the external charging source at step 400, at which time the load monitor returns to the energy monitoring routine, at step 520. Step 517 is intentionally skipped during the additional time the battery powered device remains coupled to the external charging source, as this step is only intended to increment the count once every charging session.

Figure 7A:
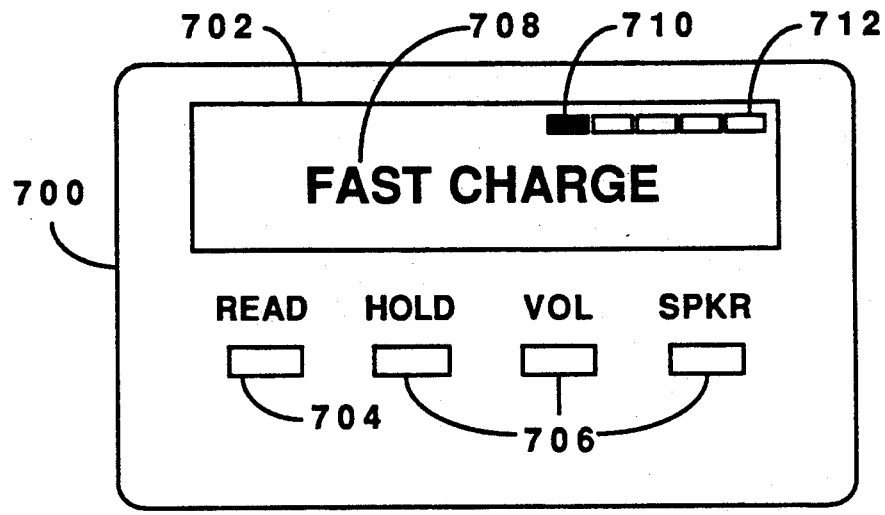
FIGS. 7A and 7B are pictorial diagrams showing the display of charging information provided on a battery powered device utilizing the charging controller of the present invention.
Figure 7B:
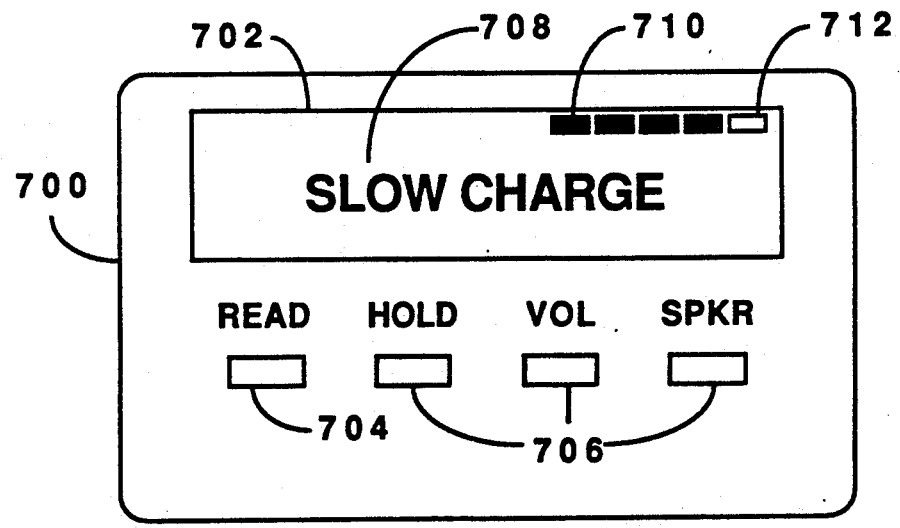

FIGS. 7A and 7B are pictorial diagrams showing the display of charging information provided on a battery powered device utilizing the charging controller of the present invention. As shown in FIG. 7A, the battery powered device 700 includes a display 702 which is normally used to display information, such as messages received by a paging receiver, or information displayed on a portable calculating device or other portable battery powered device having a display. In the case where the battery powered device is a paging receiver, a switch 704 is provided to read any received messages from memory, while switches 706 provide additional functions, not necessary to be described herein. Not shown in FIG. 7A is the on/off switch which is used to turn the device on and off. When an alphanumeric style display 702 is provided, an indication of the status of the battery is displayed. The normal message display would allow displaying such indications as "fast charge", "slow charge" and "recharged". Additional display elements 710-712 are provided to display the relative energy capacity of the battery. Elements 710 which are active, indicate as for example a twenty percent remaining battery capacity in FIG. 7A, and an eighty percent remaining battery capacity in FIG. 7B. The measure of the energy consumed is also indicated by the number of elements which are not active, such as eighty percent energy consumed as shown in FIG. 7A and twenty percent energy consumed, as shown in FIG. 7B. In addition to providing a visual indication of the status of the battery energy capacity during normal operation of the battery powered device, the "thermometer" style indicator would also provide an indication of charging status as the battery is being recharged. Also, a normalized value of the charging mode as well as the battery capacity value of (X) may be displayed, thereby indicating the percent of recharge during the cycle i.e. "quick charging at 20%" "slow charging at 80%" and "recharged at 100%".

A battery charging controller for a battery powered device has been described above. Unlike prior art battery charger controllers, the battery charger controller of the present invention is located within the battery powered device, thereby reducing the complexity of the battery charger required to be utilized with the battery powered device. Also unlike prior art battery charger controllers, the battery charger controller of the present invention relies on the measure of the energy consumed from the device battery to control both the charging time and charging rates for charging the battery. Additional monitoring of the charging of the device battery may be provided within the battery powered device, such as the ability to monitor the battery temperature, which would enhance the safety of the device should a malfunction of the energy monitor occur. The battery charging controller of the present invention will allow charging of conventional rechargeable batteries which are not provided with temperature sensing capability, by charging on the basis of actual energy consumed from the battery. When implemented with temperature monitoring capability, it can recharge batteries on the basis of actual energy consumed from the battery as well as with temperature sensing. The automatic selection of rapid charge and slow charge rates and the ability to automatically discharge the battery depending upon the measurement of the energy consumed provides increased user convenience. The implementation of the battery charging controller of the present invention is enhanced when the battery powered device includes a microprocessor or microcomputer to provide the load monitor functions described above.

While specific embodiments of the present invention have been shown and described, further modifications and improvements will occur to those skilled in the art. All modifications which retain the basic underlying principles disclosed and claimed herein are within the scope and spirit of the present invention.

We claim:

1. A method of charging a rechargeable battery for a battery powered device using an external charging source, said method comprising the steps of:
   periodically determining device functions active during a predetermined time interval;
   recovering a value for the energy consumed by the active device functions during the predetermined time interval;
   accumulating a value for the energy consumed for the active device functions during the predetermined time interval;
   accumulating a measure of the energy consumed by adding the values for the energy consumed during each predetermined time interval since the battery was previously charged; and
   controlling the charging from the external charging source in response to the measure of the energy consumed by the device.

2. The method of claim 1, wherein said step of controlling comprises said steps of:
   sensing the coupling of the external charging source with the battery powered device;
   comparing the measure of the energy consumed with a first predetermined energy consumption value;
   selecting a first predetermined charging rate from the external charging source for recharging the battery to replenish a first predetermined portion of the measured energy consumed when the measure of the energy consumed is greater than the first predetermined energy consumption value; and
   thereafter selecting at least a second predetermined charging rate from the external charging source for recharging the battery to replenish at least a second predetermined portion of the measured energy consumed.

3. The method of claim 2, wherein the second predetermined charging rate is substantially lower than the first predetermined charging rate.

4. The method of claim 2 wherein said first step of selecting selects the second predetermined charging rate from the external charging source for recharging the battery when the measure of the energy consumed is less than the first predetermined energy consumption value.

5. The method of claim 2, wherein said step of selecting further comprises selecting at least a third predetermined charging rate for recharging the battery after the measured energy consumed has been replenished and the battery powered device remains coupled to the external charging source.

6. The method of claim 5 wherein the third predetermined charging rate is the same as the second predetermined charging rate.

7. The method of claim 1, wherein the battery powered device includes switch means for controlling the supply of power to the device from the battery, and wherein said method further comprises said steps of:
   sensing when power is being supplied to the device from the battery;
   maintaining said step of monitoring the energy consumed by the battery powered device when the battery powered device is coupled with the external charging source;
   monitoring the rate at which energy is being replenished at the predetermined charging rates; and
   accumulating a value of the actual energy being replenished, which corresponds to the difference between the energy being provided by the charger, and the energy being consumed by the device.

8. The method of claim 7 further comprising said steps of:
   sensing when power is not being supplied to the device from the battery;
   suspending said step of monitoring the energy consumed when the battery powered device is coupled with the external charging source;
   monitoring the rate at which energy is being replenished at the predetermined charging rates; and
   accumulating a value of the energy being replenished.

9. The method of claim 2, wherein the external charging source further includes means for discharging the battery, and wherein said method further comprises said steps of:

generating a cycle count indicative of the number of times the battery is recharged;

comparing the measure of the energy consumed with a second predetermined energy consumption value; and discharging the battery at a predetermined discharge rate when the cycle count exceeds a predetermined number of charging cycles, and the measure of the energy consumed is greater than the first predetermined energy consumption value and greater than the second predetermined energy consumption value.

10. The method of claim 9, wherein the first predetermined energy consumption value is less than the second predetermined energy consumption value.

11. The method of claim 10, further comprising said steps of:

comparing the current battery voltage with a minimum predetermined discharge voltage; and terminating said step of discharging the battery when the current battery voltage is less than the minimum predetermined discharge voltage.

12. The method of claim 11, further comprising said steps of:

comparing the measure of the energy consumed with a third predetermined energy consumption value: and inhibiting the discharging of the battery when the measure of the energy consumed is less than or equal to the third predetermined energy consumption value.

13. The method of claim 12 wherein the third predetermined energy consumption value is greater than the second predetermined energy consumption value.

14. The method of claim 9, further comprising said steps of:

inhibiting said step of discharging the battery when the measure of the energy consumed is less than the second predetermined energy consumption value.

15. The method of claim 9, wherein the predetermined number of charging cycles is equal to at least one.

16. The method of claim 2, wherein the battery powered device includes a display for displaying battery charging information, said method further comprising said steps of:

displaying an indication of the battery powered device being recharged at the first charging rate; and further displaying an indication of the battery powered device being charged at the second charging rate.

17. The method of claim 16 further comprising said step of displaying an indication of the status of the energy capacity of the battery.

18. A battery powered device capable of being recharged from an external charging source, said device comprising:

a rechargeable battery;

a plurality of selectively activated device functions;

memory means for storing a value of the energy consumed by each of the plurality of selectively activated device functions;

timing means for periodically generating timing signals at predetermined time intervals, monitoring means, responsive to the timing signals, for periodically sampling the device functions to enable accumulating a value for the energy consumed for the device functions active during each predetermined time interval, said monitoring mean further accumulating a measure of the energy consuming by the device by adding the values for the energy consumed during each predetermined time interval since the battery was previously charged; and controller means, for controlling the charging from the external charging source in response to the measure of the energy consumed by the device.

19. The battery powered device according to claim 18 further comprising:

sensing means for sensing the coupling of the external charging source with the battery powered device, and wherein said controller means further includes comparing means for comparing the measure of the energy consumed with a first predetermined energy consumption value, said controller means, being responsive to said sensing means and to said comparing means, for selecting a first predetermined charging rate for recharging the battery to replenish a first predetermined portion of the measured energy consumed, said controller means thereafter selecting at least a second predetermined charging rate for recharging the battery to replenish at least a second predetermined portion of the measured energy consumed.

20. The battery powered device according to claim 19, wherein the selected second predetermined charging rate is substantially lower than the selected first predetermined charging rate.

21. The battery powered device according to claim 19, wherein said controller means selects the second predetermined charging rate for recharging the battery when the measure of the energy consumed is less than the first predetermined energy consumption value.

22. The battery powered device according to claim 19, wherein said controller means selects a third charging rate for recharging the battery after the measured energy consumed has been replenished and the battery powered device remains coupled to the external charging source.

23. The battery powered device according to claim 23, wherein the third predetermined charging rate is the same as the second predetermined charging rate.

24. The battery powered device according to claim 19, further comprising switch means for controlling the supply of power to the device from the battery.

25. The battery powered device according to claim 24 wherein said monitoring means is responsive to said switch means supplying power to the battery powered device, for maintaining the monitoring of the energy consumed by the battery powered device when coupled with the external charging source, and further said monitoring means being capable of monitoring the rate at which the battery is being recharged at the predetermined charging rates, and further capable of monitoring the rate at which energy is being consumed by the active device functions, for accumulating a value of the actual energy being replenished.

26. The battery powered device according to claim 24 wherein said monitoring means is further responsive to said switch means suspending the supply of power to the battery powered device, for suspending the monitoring of the energy consumed by the battery powered device when coupled with the external charging source, and further said monitoring means is capable of monitoring the rate at which the battery is being recharged at the predetermined charging rates and for accumulating a value of the energy being replenished.

27. The battery powered device according to claim 19 further comprising display means coupled to said monitoring means, and wherein said monitoring means is capable of generating an indication of the rate of charging of the battery powered device and wherein said display means is capable of displaying the indication of the rate of charging of the battery powered device.

28. The battery powered device according to claim 27 said display means displays an indication of the battery powered device being recharged at the first charging rate, and further displays an indication of the battery powered device being charged at the second charging rate.

29. The battery powered device according to claim 27 wherein said monitoring means is further capable of generating the status of the energy capacity of the battery, and wherein said display means is further capable of displaying an indication of the status of the energy capacity of the battery.

30. The battery powered device according to claim 27 further comprising voltage comparison means, coupled to the battery and to said monitoring means, for comparing the current battery voltage with a predetermined end-of-life battery voltage, said monitoring means being responsive to said voltage comparing means for generating an indication of the battery condition when the measure of the energy consumed is greater than a third predetermined energy consumption value and the current battery voltage is less than the end-of-life battery voltage.

31. The battery powered device according to claim 20 wherein the external charging source includes a means for discharging the battery, and wherein said battery powered device further comprises:

cycle counting means, for generating a cycle count indicative of the number of times the battery is recharged, said comparing means further compares the measure of the energy consumed with a second predetermined energy consumption value, and said controller means being further responsive to said comparing means and to said cycle counting means for selecting the discharging of the battery at a predetermined discharge rate when the cycle count indicated exceeds a predetermined number of charging cycles, and the measure of the energy consumed is greater than the first predetermined energy consumption value and greater than the second predetermined energy consumption value.

32. The battery powered device according to claim 31 wherein the first predetermined energy consumption value is less than the second predetermined energy consumption value.

33. The battery powered device according to claim 32 wherein said comparing means compares the measure of the energy consumed with a third predetermined energy consumption value, and said controller means being responsive to said comparing means for inhibiting the discharging of the battery when the measure of the energy consumed is less than or equal to the third predetermined energy consumption value.

34. The battery powered device according to claim 33 wherein the third predetermined energy consumption value is less than the second predetermined energy consumption value.

35. The battery powered device according to claim 31 wherein said controller means being further responsive to said comparing means for inhibiting the discharging of the battery at the predetermined discharge rate when the measure of the energy consumed is less than the second predetermined energy consumption value.

36. The battery powered device according to claim 31, wherein the predetermined number of charging cycles is equal to at least one.

37. The battery powered device according to claim 18 wherein said monitoring means comprises a microcomputer.

38. The battery powered device according to claim 39 wherein said microcomputer further controls the operation of the battery powered device.

39. The battery powered device according to claim 37 wherein said controller means further controls the operation of the battery powered device.

40. The battery powered device according to claim 18 wherein the battery powered device is a battery powered communication receiver.

* * * * *